US011953987B1

(12) United States Patent
Oboukhov et al.

(10) Patent No.: US 11,953,987 B1
(45) Date of Patent: Apr. 9, 2024

(54) TRAINED STATES EQUALIZER IN A READ CHANNEL

(71) Applicant: Western Digital Technologies, Inc., San Jose, CA (US)

(72) Inventors: Iouri Oboukhov, Rochester, MN (US); Richard Galbraith, Rochester, MN (US); Jonas Goode, Lake Forest, CA (US); Henry Yip, Bellflower, CA (US); Niranjay Ravindran, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/946,399

(22) Filed: Sep. 16, 2022

(51) Int. Cl.
*G06F 11/10* (2006.01)
*G06N 7/01* (2023.01)

(52) U.S. Cl.
CPC ........... *G06F 11/1056* (2013.01); *G06N 7/01* (2023.01)

(58) Field of Classification Search
None
See application file for complete search history.

(56) References Cited

U.S. PATENT DOCUMENTS

| | | | |
|---|---|---|---|
| 5,361,327 A | 11/1994 | Takahashi | |
| 8,661,071 B2* | 2/2014 | Yang | G11B 20/10046 708/323 |
| 8,699,167 B2* | 4/2014 | Xia | H04L 25/03254 375/232 |
| 9,525,436 B2 | 12/2016 | Tan et al. | |
| 9,875,770 B1 | 1/2018 | Singleton et al. | |
| 11,677,420 B1* | 6/2023 | Galbraith | H03M 13/6331 714/752 |
| 2011/0085628 A1 | 4/2011 | Kaynak et al. | |
| 2013/0343495 A1* | 12/2013 | Han | H03M 13/6331 375/350 |
| 2016/0293205 A1 | 10/2016 | Jury et al. | |
| 2019/0204088 A1 | 7/2019 | Haque | |
| 2019/0385094 A1* | 12/2019 | Alex | G06N 20/20 |
| 2020/0099401 A1 | 3/2020 | Qin | |
| 2020/0389188 A1 | 12/2020 | Belzer | |
| 2022/0376711 A1* | 11/2022 | Oboukhov | H03M 13/1111 |

(Continued)

OTHER PUBLICATIONS

L. R. Carley and S. Sridharan, "A pipelined 16-state generalized Viterbi detector," in IEEE Transactions on Magnetics, vol. 34, No. 1, pp. 181-186, Jan. 1998, doi: 10.1109/20.663520. (Year: 1998).*

(Continued)

*Primary Examiner* — Daniel F. McMahon
(74) *Attorney, Agent, or Firm* — PATENT LAW WORKS LLP

(57) ABSTRACT

Example systems, read channels, and methods provide states equalization for a digital data signal in preparation for a soft output detector. The states equalizer determines a set of signal values from the digital data signal and filters the set of signal values through a set of finite impulse response filters configured to generate a set of state values for a target signal value, where each filter corresponds to a potential state of the target signal value. Based on the state values, a set of probabilities for possible states is determined and used to populate a decision matrix for a soft output detector.

22 Claims, 9 Drawing Sheets

(56) References Cited

U.S. PATENT DOCUMENTS

2023/0208445 A1* 6/2023 Galbraith ......... G11B 20/10268
714/780

OTHER PUBLICATIONS

Sayyafan et al., "Deep Neural Network Based Medial Noise Predictors for Use in High-Density Magnetic Recording Turbo-Detectors," IEEE Transactions on Magnetics, vol. 55, No. 12, available online at https://ieeexplore.ieee.org/document/8903447, Dec. 2019, 6 pages.

Shen et al., "Deep Neural Network a Posteriori Probability Detector for Two-dimensional Magnetic Recording," available online at https://par.nsf.gov/servlets/purl/10198635, Oct. 21, 2019, 12 pgs.

Shen et al., "TDMR Detection System with Local Area Influence Probabilistic a Priori Detector," available online at https://arxiv.org/pdf/1904.06599.pdf, Apr. 13, 2019, 7 pgs.

Chesnutt, "Novel Turbo Equalization Methods for the Magnetic Recording Channel," Doctor of Philosophy in Electrical and Computer Engineering dissertation, Georgia Institute of Technology, available online at https://smartech.gatech.edu/bitstream/handle/1853/6867/chesnutt_elizabeth_200505_phd.pdf, May 2005, 116 pgs.

* cited by examiner

TRAINED STATES EQUALIZER IN A READ CHANNEL

TECHNICAL FIELD

The present disclosure relates to data detection. In particular, the present disclosure relates to improved read channel data detection using a trained states equalizer.

BACKGROUND

In present-day data transmission and storage mediums, such as disk, tape, optical, mechanical, and solid-state storage drives, data detection is based in large part on techniques developed in the early years of the data storage industry. While recently developed read channels invoke relatively new data encoding and detection schemes such as iterative detection and low-density parity codes (LDPC), much of the signal processing power in today's read channels is still based on partial-response maximum-likely-hood detection (PRML), developed in the early 1990's. Iterative LDPC code detectors use successive iterations and calculated reliability values to arrive at the most likely value for each bit. Soft information may be calculated for each bit and is sometimes represented by a log likelihood ratio (LLR) value, which is the natural logarithm of the ratio of the probability that the bit is a 1 divided by the probability that the bit is a 0. In some configurations a soft output Viterbi algorithm (SOVA) detector that determines LLR values for each bit may be paired with an iterative decoder for determining bias values for the next iteration of the SOVA. For example, a SOVA detector may be paired with an LDPC detector that receives bit LLR values, returns extrinsic LLR values, and outputs hard decisions when LDPC constraints are met.

For iterative detectors to perform well (with acceptably low bit error rates (BER)), the signal-to-noise ratio (SNR) of the read channel needs to meet certain criteria. One component of conventional read channels that assists in improving SNR is a pattern dependent noise predictor (PDNP), which is configured to correct mis-equalization of signal and remove noise correlations, depending on the state context. However, in iterative detection, it is not merely the best SNR that improves accurate data detection, but the mutual information of the SOVA detector output relative to the signal pattern.

There is a need for technology that efficiently optimizes signal conditioning for mutual information of the SOVA detector output prior to processing by the SOVA detector.

SUMMARY

Various aspects for data detection from a read signal using a states equalizer, particularly a states equalizer trained for improving mutual information of an iterative detector are described.

One general aspect may include a read channel circuit including a states equalizer configured to: receive a digital data signal representing a series of data bits; determine a set of signal values from the digital data signal; filter the set of signal values through a set of finite impulse response filters configured to filter the set of signal values to a set of state values for a target signal value; and determine, based on the state values, a set of probabilities for possible states of the target signal value. The read channel circuit also includes a soft output detector configured to receive the set of probabilities for possible states from the states equalizer to populate a decision matrix.

Implementations may include one or more of the following features. The set of finite impulse response filters may include weight coefficients trained to increase mutual information based on separating correct states from incorrect states. The set of finite impulse response filters may include a plurality of finite impulse response filters; each filter of the plurality of finite impulse response filters may be trained as a state equalizer for a corresponding state of the set of state values; and each filter of the plurality of finite impulse response filters may be trained to return a first value if the corresponding state is correct for the target signal value and a second value if the corresponding state is incorrect for the target signal value. The set of finite impulse response filters may be trained using stochastic gradient descent using mean square error and a mutual information metric. Filter output values from a training set of signal values may be divided into at least an inner range, a first outer range, and a second outer range; the set of finite impulse response filters may be trained using a first training condition for adjusting weight coefficients for filter output values in the inner range, a second training condition for adjusting weight coefficients for filter output values in the first outer range, and a third training condition for adjusting weight coefficients for filter output values in the second outer range; the first training condition may include correction based on correct state and incorrect state filter output values in the inner range; the second training condition may exclude correction of incorrect state filter output values in the first outer range; and the third training condition may exclude correction of correct state filter output values in the second outer range. The read channel circuit may include an iterative decoder configured to use soft information from the decision matrix of the soft output detector to decode data units from the digital data signal, where the read channel circuit is configured to: determine a training set of signal values using data processed by the iterative decoder; and train, responsive to data processing operations of the read channel circuit, weight coefficients of the set of finite impulse response filters. The set of finite impulse response filters may be trained using a first training phase for training mean values, means square error values, and mutual information metrics and a second training phase for extended training of mean square error values and mutual information metrics with fixed mean values; the first training phase may include a first portion of signal values in a training set of signal values; and the second training phase may include a second portion of signal values in the training set of signal values that follow the first portion. Determining the set of probabilities for possible states may include: determining a matrix of measured values mapping probability density functions of input states to output states; and comparing the set of state values to the matrix of measured values to compute the set of probabilities for possible states for the target signal value. The determining the matrix of measured values further may include collecting a mean value and a mean square error sigma$^2$ value for each node of the matrix; and comparing the set of state values to the matrix of measured values includes computing deviation of state values from the set of state values from mean values using mean square error sigma$^2$. The read channel circuit may include a signal equalizer configured to: receive at least one digital read signal from at least one corresponding read element; and combine the at least one digital read signal and at least one corresponding reference signal to equalize the digital data signal received by the states equalizer. A data storage device may include the read channel circuit.

Another general aspect includes a method that includes: determining a set of signal values from a digital data signal representing a series of data bits; filtering the set of signal values through a set of finite impulse response filters configured to filter the set of signal values to a set of state values for a target signal value, where each filter in the set of finite impulse response filters corresponds to a potential state of the target signal value; determining, based on the state values, a set of probabilities for possible states of the target signal value; and populating, using the set of probabilities, a decision matrix for a soft output detector.

Implementations may include one or more of the following features. The method may include training weight coefficients of the set of finite impulse response filters to increase mutual information based on separating correct states from incorrect states. The method may include: decoding, by an iterative decoder using soft information from the decision matrix of the soft output detector, data units from the digital data signal; determining a training set of signal values using data processed by the iterative decoder; and training, responsive to data processing operations of a read channel circuit, weight coefficients of the set of finite impulse response filters. The method may include: training each filter in the set of finite impulse response filters as a state equalizer for a corresponding state of the set of state values; and training each filter of the set of finite impulse response filters to return a first value if the corresponding state is correct for the target signal value and a second value if the corresponding state is incorrect for the target signal value. The method may include training the set of finite impulse response filters using stochastic gradient descent based on mean square error and a mutual information metric. The method may include: dividing filter output values from a training set of signal values into at least an inner range, a first outer range, and a second outer range; and training the set of finite impulse response filters by adjusting weight coefficients to correct for filter output values, where training the set of finite impulse response filters includes correcting for correct state and incorrect state filter output values within the inner range, excluding correction for incorrect state filter output values in the first outer range, and excluding correction of correct state filter output values in the second outer range. The method may include: training, during a first training phase, the set of finite impulse response filters using mean values, means square error values, and mutual information metrics, where the first training phase includes a first portion of signal values in a training set of signal values; and training, during a second training phase and with fixed mean values, the set of finite impulse response filters for extended training of mean square error values and mutual information metrics, where the second training phase includes a second portion of signal values in the training set of signal values that follow the first portion. Determining the set of probabilities for possible states may include: determining a matrix of measured values mapping probability density functions of input states to output states; and comparing the set of state values to the matrix of measured values to compute the set of probabilities for possible states for the target signal value. The determining the matrix of measured values further may include collecting a mean value and a mean square error sigma$^2$ value for each node of the matrix; and comparing the set of state values to the matrix of measured values may include computing deviation of state values from the set of state values from mean values using mean square error sigma$^2$. The method may include: receiving, by a signal equalizer, at least one digital read signal from at least one corresponding read element; and combining, by the signal equalizer, the at least one digital read signal and at least one corresponding reference signal to equalize the digital data signal.

Still another general aspect includes a system that includes: means for receiving at least one digital read signal from at least one corresponding read element; means for combining the at least one digital read signal and at least one corresponding reference signal to equalize a digital data signal representing a series of data bits; means for determining a set of signal values from the digital data signal; means for filtering the set of signal values through a set of finite impulse response filters configured to filter the set of signal values to a set of state values for a target signal value, where each filter in the set of finite impulse response filters corresponds to a potential state of the target signal value; means for determining, based on the state values, a set of probabilities for possible states of the target signal value; and means for populating, using the set of probabilities, a decision matrix for a soft output detector.

The present disclosure describes various aspects of innovative technology capable of improving read channel data detection using a trained states equalizer prior to the iterative detector. The trained states equalizer provided by the technology may be applicable to a variety of computer systems, such as storage networks, storage systems, and/or signal transmission networks. The novel technology described herein includes a number of innovative technical features and advantages over prior solutions, including, but not limited to improved data detection in a storage device and flexibility to be adapted to data detection and analysis in a variety of different fields.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, data storage devices, read channels, and methods for detecting, decoding, and/or recovering previously encoded data in a data channel, such as a data storage read channel or data transmission receiver using a states equalizer to determine initial state probabilities for populating a decision matrix are disclosed. While this technology is described below in the context of a particular system architecture in various cases, it should be understood that the systems and methods can be applied to other architectures and organizations of hardware.

Figure 1A:
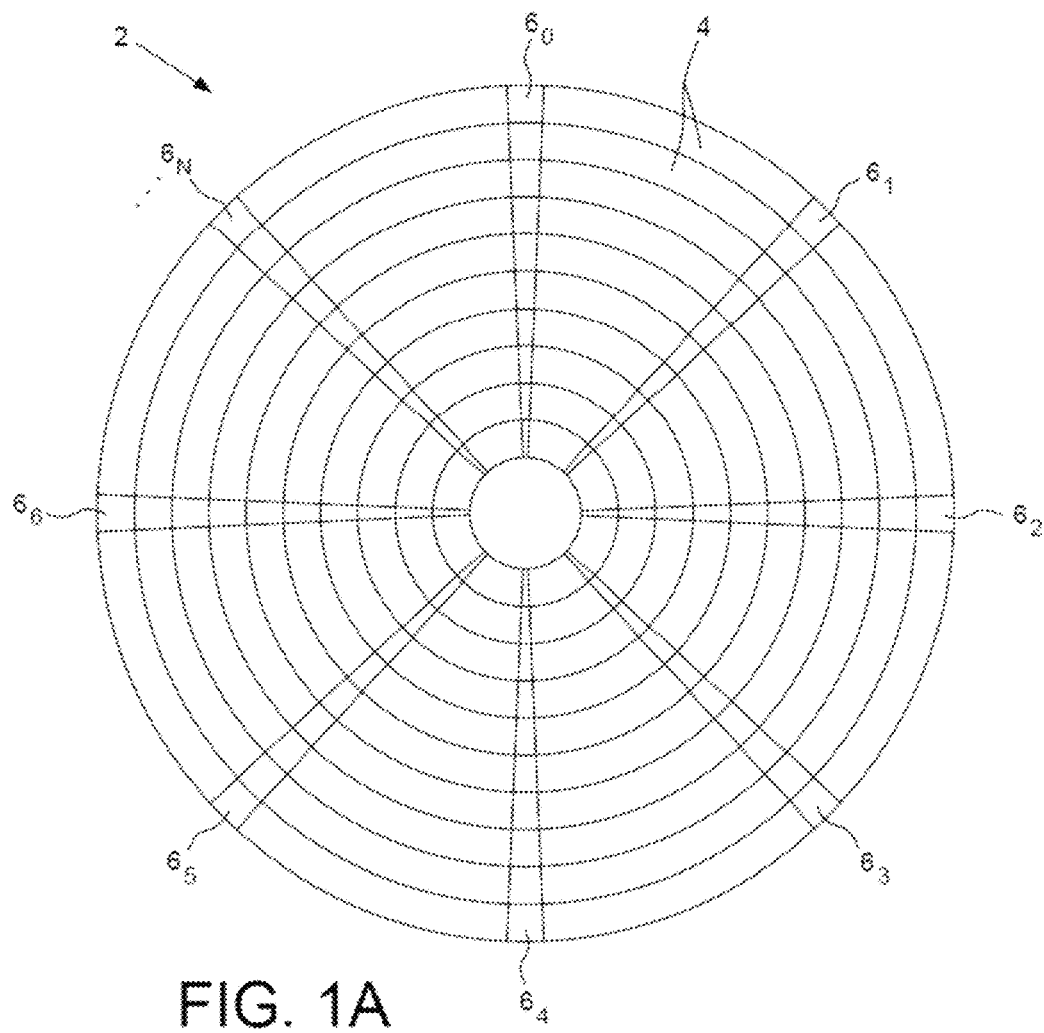
FIG. 1A is a block diagram of a prior art disk format comprising a plurality of servo tracks defined by servo sectors.
Figure 1B:
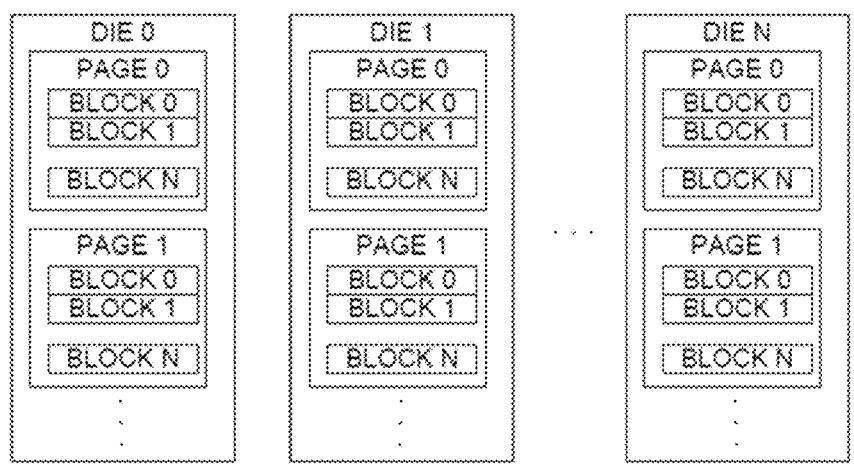
FIG. 1B is a block diagram of a prior art solid state drive format comprising a plurality of dies each comprising a plurality of pages.

In some examples, the data channel technology may be applied to a data storage read channel for recovering encoded data from a non-volatile storage medium. For example, the read channel may be incorporated in a data storage device, such as a hard disk drive (HDD), a solid-state drive (SSD), a flash drive, an optical drive, a tape drive, etc. FIG. 1A shows a prior art disk format 2 as comprising a number of servo tracks 4 defined by servo sectors 60-6N recorded around the circumference of each servo track. Data tracks are defined relative to the servo tracks at the same or different radial density, wherein each data track comprises a plurality of data sectors. Each data sector may store the data symbols of a single codeword, or in other examples, each data sector may store symbols from multiple codewords (i.e., interleaved codewords). FIG. 1B shows a prior art die format for a solid state drive, wherein each die may store multiple pages and each page may store multiple blocks each corresponding to a data sector or other data unit of encoded binary data of a disk drive.

In data storage devices incorporating non-volatile storage media, such as the disk of FIG. 1A or the non-volatile memory devices of FIG. 1B, an analog read signal from the storage media may be converted into a digital bit stream by an analog-to-digital-converter (ADC) and passed to the read channel for further processing. In some examples, bit data values may be stored to a non-volatile storage medium as data blocks or other data units using one or more encoding schemes. These bit data values may be processed from the digital bit stream in windows of multiple adjacent bits and a set of adjacent bits, such as 2, 3, 5, 7, or more continuous bits from the bit stream, may be processed as a symbol for data detection and/or decoding purposes. One or more symbols may, in turn, make up one or more codewords, such as codewords selected and encoded in accordance with an error detection and/or correction scheme, such as low-density parity check (LDPC) codes. These encoded codewords may be decoded to determine decoded bit values. In some examples, the decoded bit values from these codewords may still be subject to further decoding, such as run-length limited (RLL) decoding and/or descrambling to arrive that the output data. While the description below refers to non-volatile storage medium/media (NVSM) examples, the various examples disclosed could be applied to process data read from volatile medium/media as well, as well as data signals transmitted through and/or received from a wired, wireless, or other transmission medium.

Figure 2:
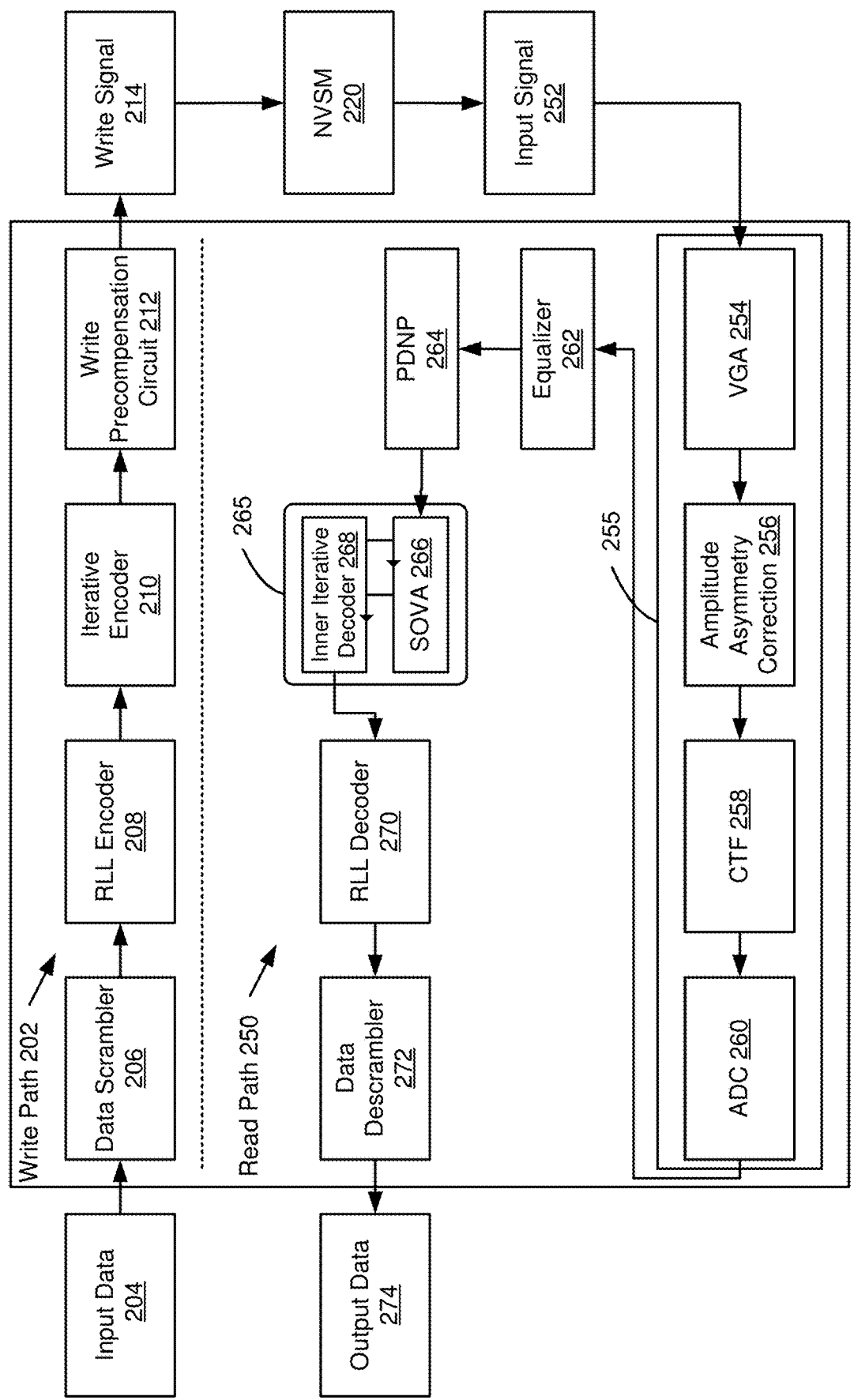
FIG. 2 is a block diagram of an existing storage system including various data processing components.

Referring to FIG. 2, a block diagram illustrating a configuration 200 comprising components employed in a known read/write path of a storage system. As illustrated, the write path 202 includes a data scrambler 206, an RLL encoder 208, an iterative encoder 210, and a write precompensation circuit 212. A write signal 214 may be output by the write path in some examples to store the resulting write bit stream to NVSM 220. Similarly, an input signal 252 may be read from NVSM 220 for processing through a read path 250. Read path 250 includes a variable gain amplifier (VGA) 254, an amplitude asymmetry correction (AAC) component 256, a continuous time filter (CTF) 258, an ADC 260, an equalizer 262, a PDNP filter 264, a soft output Viterbi algorithm (SOVA) detector 266, an inner iterative decoder 268, a RLL decoder 270, and a data descrambler 272. These component(s) receive input signals 252 as an analog read signal, and process, decode, and output the signals as output data 274, which may include decoded binary data units, such as data blocks. In some examples, these component(s) of read path 250 may comprise a read channel device or circuit.

The data scrambler 206 "randomizes" input data 204 ("whitens" the input sequence of the data) to be written into a storage media. In general, a storage system has no control over the data the user is going to write. This causes problems because it violates the assumptions that are usually made when designing storage systems, such as having independent data symbols. Since the data are not random, a frequently occurring problem is long strings of zeros in the data, which can cause difficulties in later timing recovery and adaptive equalization. These problematic sequences can be removed (or, actually, made much less likely) by introducing randomization of the input sequence for the input data 204. Therefore, during the data writing process, input data 204 may be first randomized by the data scrambler 206.

The RLL encoder 208 modulates the length of stretches in the randomized data. The RLL encoder 208 employs a line coding technique that processes arbitrary data with bandwidth limits. Specifically, the RLL encoder 208 can bound the length of stretches of repeated bits so that the stretches are not too long or too short. By modulating the data, the RLL encoder 208 can reduce the timing uncertainty in later decoding the stored data which would lead to the possible erroneous insertion of bits when reading the data back, and thus ensure the boundaries between bits can always be accurately found.

The iterative encoder 210 can append one or more parity bits to the modulated block code for later detection whether certain errors occur during data reading process. For instance, an additional binary bit (a parity bit) may be added to a string of binary bits that are moved together to ensure that the total number of "F"s in the string is even or odd. The parity bits may thus exist in two different types, an even parity in which a parity bit value is set to make the total number of "F"s in the string of bits (including the parity bit) to be an even number, and an odd parity in which a parity bit is set to make the total number of "F"s in the string of bits (including the parity bit) to be an odd number. In some examples, iterative encoder 210 may implement a linear error correcting code, such as LDPC codes or other turbo codes, to generate codewords that may be written to and more reliably recovered from NVSM 220. In some examples, iterative encoder 210 may further implement one or more single parity check codes within the codeword for recovery using soft information decoding, such as SOVA, Bahl, Cocke, Jelinek, Raviv (BCJR), or other single parity check code decoding techniques. The iterative encoder 210 may implement iterative encoding techniques to reuse the decoder architecture, thereby reducing circuit space.

The write precompensation circuit 212 can alleviate the effect of nonlinearities in the writing process. Major causes of the nonlinearities during data writing include bandwidth limitations in the write path and the demagnetizing fields in the magnetic medium for magnetic disks. These nonlinearities can cause data pattern-dependent displacements of recorded transitions relative to their nominal positions. The write precompensation circuit 212 can compensate for these data pattern-dependent displacements by introducing data pattern-dependent compensating shifts into the signals. After compensation, the information may then be written as NRZ (non-return to zero) data.

In an HDD embodiment, when reading data back from the NVSM 220, the data head of a storage drive senses the transitions (changes) in the storage medium and converts the information back into an electronic waveform. Reading analog input signal 252 from a storage medium starts at the storage medium (e.g., the drive's storage platter) and head transducer read element (not shown). The head transducer is located prior to the preamplifier circuit in the data read path and the read element output is driven by the data pattern previously written on a rotating disk. After converting into an electronic waveform, the read element output (e.g., input signal 252 or analog read signal) may be further processed by the components illustrated in FIG. 2 in the read path 250 for data detection, decoding, and descrambling.

The VGA 254 amplifies the analog signal read back from the storage medium. The VGA 254 controls a signal level of the read-back analog signal based on a gain determined by an automatic gain control loop. One main function of the automatic gain control loop is to control an input signal level for optimum performance in the ADC 260. Too much gain from the VGA 254 can cause sample values in the ADC 260 to rail at maximum or minimum ADC levels, while too little gain can cause quantization noise to dominate the SNR (signal-to-noise ratio) and thus adversely affect bit error rate performance.

The AAC 256 and the CTF 258 work to linearize the amplified analog signal prior to feeding it to the ADC 260. In an HDD embodiment, the AAC 256 works to reconstruct linearity that may have been lost in the head transducer stage when the information on the storage disk is converted into an electronic signal at the output of the data head. The biasing of the head signal may in some cases be adjusted to keep the signal in the linear range of the head sensitivity curve. However, if the signal amplitude changes due to fly height or disk variation exceed the head transducer linear range, saturation in the peak or trough of the electrical head signal can occur. The AAC 256 may use signal offset to determine the amount of squared signal to add back to restore the positive and negative symmetry of the signal.

It should be noted that in practice, the read back analog signals from many different commonly used heads in existing devices cannot be linearized, regardless of the kind of biasing approach that is employed. Thus, improving data detection and recovery technology in the read channel can advantageously handle the read back signals from these types of heads because it may better compensate for non-linear responses from the read heads.

The CTF 258 provides mid-band peaking to help attenuate high-frequency noise and minimize any aliasing that may occur when the analog signal is converted to a sampled representation. In an HDD embodiment, aliasing may not have a large effect on a drive surface's bit error rate performance. However, it can have an impact on disk drive manufacturing yields. The CTF 258 is typically a multiple pole low pass filter (e.g., a four pole Butterworth filter) with a zero available for mid-band peaking. Signal peaking can be used to emphasize frequency components, which are useful in shaping the signal to meet the digital target signal characteristic. Besides anti-aliasing, the CTF 258 may also partially equalize the data.

The ADC 260 can convert an analog read signal (e.g., input signal 252, as input and/or processed by upstream components) to digital samples quantized in time and amplitude. The clock used may include the output of a digital phase-locked loop, which tracks the channel rate clock frequency. The output of the ADC may be used as feedback to control the timing of the digital phase-locked loop as well as the automatic gain control, DC baseline correction, and equalization. The VGA 254, the CTF 258, and the ADC 260, with or without the AAC 256, together may be called an analog front end 255, as the signals processed in these components are analog, while the signals in the remaining downstream components of the read path may be digital, although other variations of an analog front end 255 (which may be considered as one example form of an analog to digital convertor) may comprise software and/or hardware elements configured to convert signals from analog to digital and/or include other components for filtering, tuning, and/or processing data. In an HDD embodiment, the read channel analog front-end functions are generally similar regardless of whether the data is recorded using perpendicular or horizontal techniques.

The equalizer 262 is used for compensating for channel distortion. For example, an FIR filter may perform filtering to provide additional equalization of the signal to match signal characteristic to the desired target response for bit detection. Some equalizers may also include a noise whitening filter that further equalizes the spectrum of the signal from the FIR samples to remove noise that has non-flat amplitude spectrum. For example, the noise whitening filter may enhance low-level spectral components and attenuates high-level ones. In some configurations, the equalizer may use signals from multiple read elements or head transducers and corresponding reference signals to generate an equalized digital data signal.

The PDNP filter 264 may be used for reducing noise that corresponds to specific data patterns. For example, the PDNP filter 264 may correct mis-equalization of the equalized digital data signal and remove noise correlations, depending on different signal contexts. In some configurations, a target signal is compared to ideal signal values for a number of contexts to determine a set of delta signal values and process them through a noise predictor configured to remove noise correlations in the digital data signal. At the output of the PDNP filter 264, the signal is now in a fully digital form and ready for detection of the encoded bits. The sample stream is submitted to the sequence detector (e.g., the iterative decoder 265) to begin decoding in trellises for bit recovery.

The SOVA 266 may use a Viterbi-like algorithm to decode a bit stream for bit recovery. The SOVA 266 may include a variant of the classical Viterbi algorithm. It may differ from the classical Viterbi algorithm in that it uses a modified path metric which takes into account a priori probabilities of the input symbols, and produces a soft output indicating the reliability of the decision. The SOVA 266 operates by constructing a trellis of state of probabilities and branch metrics. In some examples, SOVA 266 may be configured to detect the probabilities of bit values based on single parity check codes. Once the bit recovery is completed, parity post-processing can be performed. In some examples, an initial set bit probabilities may be provided to inner iterative decoder 268 for parity-based decoding of the codeword, initiating iterative bit detection by SOVA 266 and parity determination by inner iterative decoder 268 with the two components exchanging sets of bit probabilities as extrinsic information for reaching their maximum likelihood results and returning a decoding decision.

The inner iterative decoder 268 may help to ensure that the states at the parity block boundary satisfy the parity constraint by conducting parity error checking to determine whether data has been lost or written over during data read/write processes. It may check the parity bits appended by the iterative encoder 210 during the data writing process, and compare them with the bits recovered by the SOVA 266. Based on the setting of the iterative encoder 210 in the data writing process, each string of recovered bits may be checked to see if the "F"s total to an even or odd number for the even parity or odd parity, respectively. A parity-based post processor may also be employed to correct a specified number of the most likely error events at the output of the Viterbi-like detectors by exploiting the parity information in the coming sequence. The SOVA 266 and the inner iterative decoder 268 together may be referred to as an iterative decoder 265, as iterative decoding may exist between the two components. For example, SOVA 266 may pass detected sets of bit probabilities to inner iterative decoder 268 and inner iterative decoder 268 may use those bit probabilities to determine a most likely codeword match. If decode decision parameters are not met, inner iterative decoder 268 may feedback soft information for the set of bit probabilities to SOVA 266 as extrinsic information for further iterations of the SOVA bit detector and SOVA 266 may feed forward a new set of bit probabilities for each iteration to inner iterative decoder 268. When decode decision parameters are met, the codeword may be decoded into a set of decoded bit values for output or further processing by RLL decoder 270 and data descrambler 272.

The RLL decoder 270 may decode the run length limited codes encoded by the RLL encoder 208 during the data writing process, and the data descrambler 272 may descramble the resulting sequence, which eventually can reveal the original user data written into the storage media. The recovered or read data, output data 274, may then be sent to a requesting device, such as a host computer, network node, etc., in response to receiving the request for the data.

Figure 3:
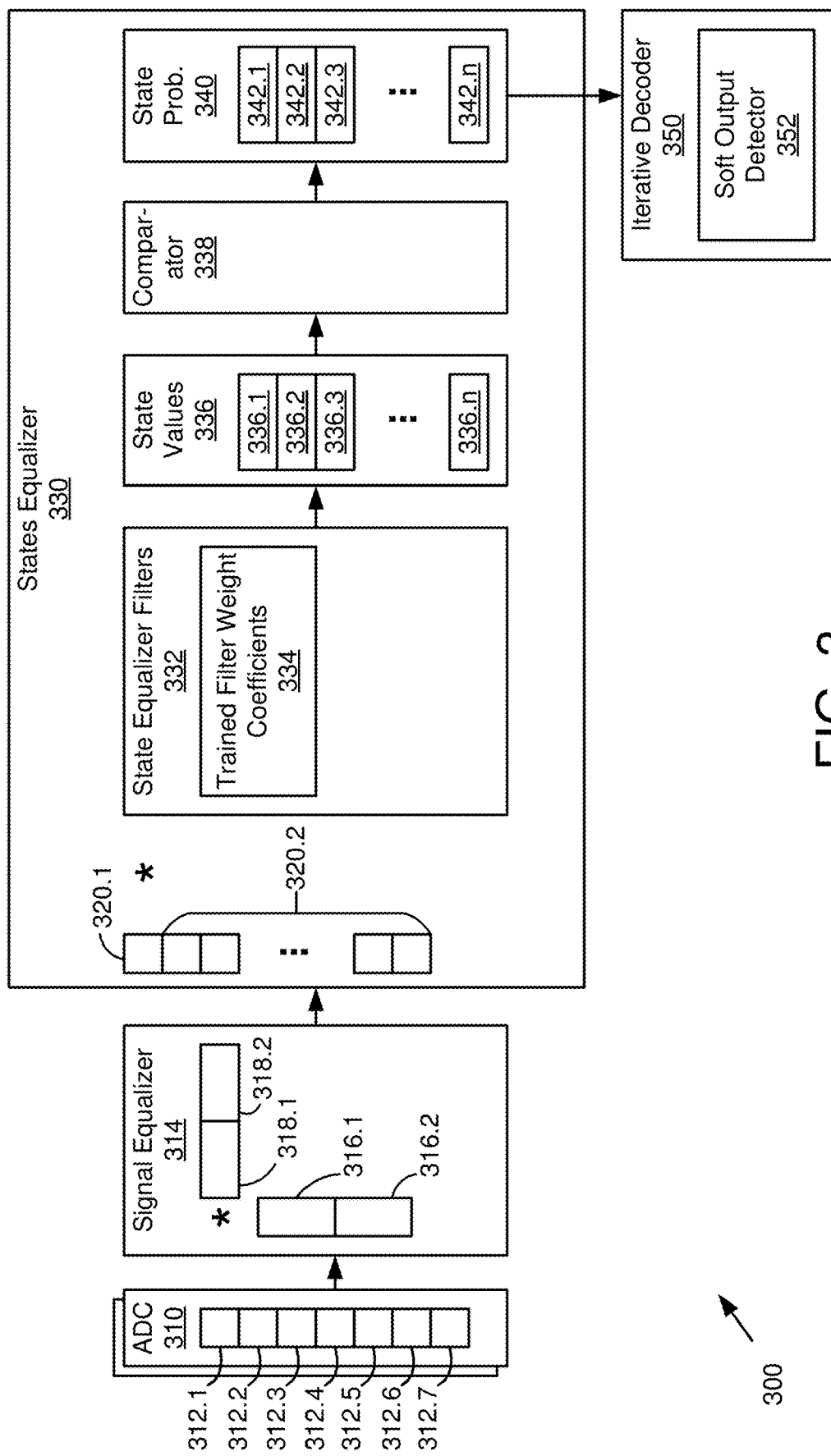
FIG. 3 is an example block diagram of a states equalizer in a portion of a data channel.

Referring to FIG. 3, an example states equalizer 330 in a portion of a read channel circuit 300 is shown. An input stream of data signals 312 may be determined by an ADC 310, such as ADC 260 in FIG. 2. For example, the digital data signal from ADC 310 may include sequences of bits corresponding to a particular read operation and data unit, such as a data block. A data block or similar data unit may be comprised of a large number of bits, such as 512 or 1024 bytes of binary data, and bit detection and decoding may proceed sequentially through a digital bit stream from ADC 310. Read channel circuit 300 may sequentially return decoded data to a buffer configured to reconstruct the original data block, allowing individual components of the read channel to operate on smaller subunits, such as bits, symbols, sub-blocks, and/or various configurations of moving windows of sequential signal values selected to meet other processing considerations. In some configurations, signal values 312.1-312.7 may correspond to individual data bits or symbols represented in the analog read signal and the digital data signal from ADC 310. In some configurations, multiple ADCs may operate in parallel to sample digital values from multiple analog read signals corresponding to multiple read elements.

Signal equalizer 314 may be configured to equalize the digital data signal from ADC 310. In some configurations, signal equalizer 314 may be configured to equalize multiple read signals from multiple read elements (and corresponding digital data signals from respective ADCs) into a single combined and equalized digital data signal. For example, signal equalizer 314 may receive digital read signals from two read elements and use parallel signal values 316.1 and 316.2 and equalization reference values 318.1 and 318.2 to generate an equalized signal value, such as target signal value 320.1, using a two-dimensional equalizer or wave form combiner. In some configurations, signal equalizer 314 may receive signal values 316.1 and 316.2 as column vectors and combine them with reference values or waveforms to equalize the digital data signal and provide a single stream of equalized digital data values to states equalizer 330. In other configurations, a single read element may provide the analog read signal, a single ADC 310 may digitize the analog read signal, and signal equalizer 314 may be configured as a one-dimensional equalizer with a corresponding reference waveform for combination with the digital data signal. In some configurations, the functions of signal equalizer 314 may be incorporated into states equalizer 330. For example, waveform combining could be an additional function within states equalizer 330.

States equalizer 330 may be configured to use a moving window of sequential signal values 320 and a set of state equalizer filters that filter the set of signal values to get a set of state values for a target signal value. Each state equalizer filter acts as a signal filter for that particular state, attempting to force the state output to indicator values for correct and incorrect states, such as a 1 for the correct state and 0 for the incorrect states. The set of sequential signal values 320 may include a target signal value 320.1 and a number of preceding signal values 320.2 from the equalized digital data signal. The number of signal values X in the moving window may be selected for a desired number of inputs to each filter. For example, set of sequential values 320 may include 14 signal values (the target signal value and 13 preceding signal values in the digital data signal) corresponding to 14 taps in each state equalizer filter. X may be chosen for specific noise considerations, desired accuracy of the system, and/or cost/complexity of states equalizer 330.

State equalizer filters 332 may include a number of linear finite impulse response (FIR) filters equal to the number of states being filtered for. In some examples, states equalizer 330 may be configured for a symbol consisting of one or more sample bits for each probability determination operation. For example, in some configurations, the symbol size N may be 2 or greater and all possible combinations of the plurality of bits may determine the number of possible states of the symbol. For example, a symbol size of 2 would have four states (11, 10, 01, 00), a symbol size of 3 would have 8 states, a symbol size of 4 would have 16 states, a symbol size of 5 would have 32 states, etc. In some examples, a 4-bit symbol with 16 states may be preferred. The number of state equalizer filters may be selected to provide a dedicated FIR filter for each of the states, such as 16 filters for the 16 possible states of a 4-bit symbol. In the example shown, state equalizer filters 332 would include n filters corresponding to the n state values 336.1-336.$n$. In the 4-bit symbol example, n would be 16 for the number of corresponding potential states.

State equalizer filters 332 may be trained toward outputting indicator values for correct and incorrect states, such as a 1 for the correct state and 0 for the incorrect states. However, even after training, each state equalizer filter may not achieve the indicator values, but still output a range of values around the desired indicator values. The objective of training state equalizer filters 332 may be to configured the weight coefficients prior to production use of the read channel, such as during a configuration process when manufacturing data storage devices. The set of trained filter weight coefficients 334 may then be used by the read channel for processing digital data signals going forward. In some configurations, the set of trained filter weight coefficients 334 for state equalizer filters may be trained using stochastic gradient descent (SGD) or another optimization algorithm capable of finding optimal weight coefficients for each state equalizer filter 332. For example, each state equalizer filter may be trained to optimize the minimum square deviation of the output signal compared to a desired value (based on the input signal). This minimum square error (MSE) metric may be used to train each filter. In other configurations, the state equalizer filters may be trained to output signal values which provide optimal mutual information (MI) relative to a desired signal value. The evaluation of soft information for state equalizer output will be further discussed below. In some configurations, both metrics (MSE and MI) may be used for training to increase the system stability. In some configurations, the weight coefficients may be updated using simple gradient descent or using a more advanced gradient-based optimization algorithm for stochastic object functions, such as the Adam optimization algorithm.

Figure 4:
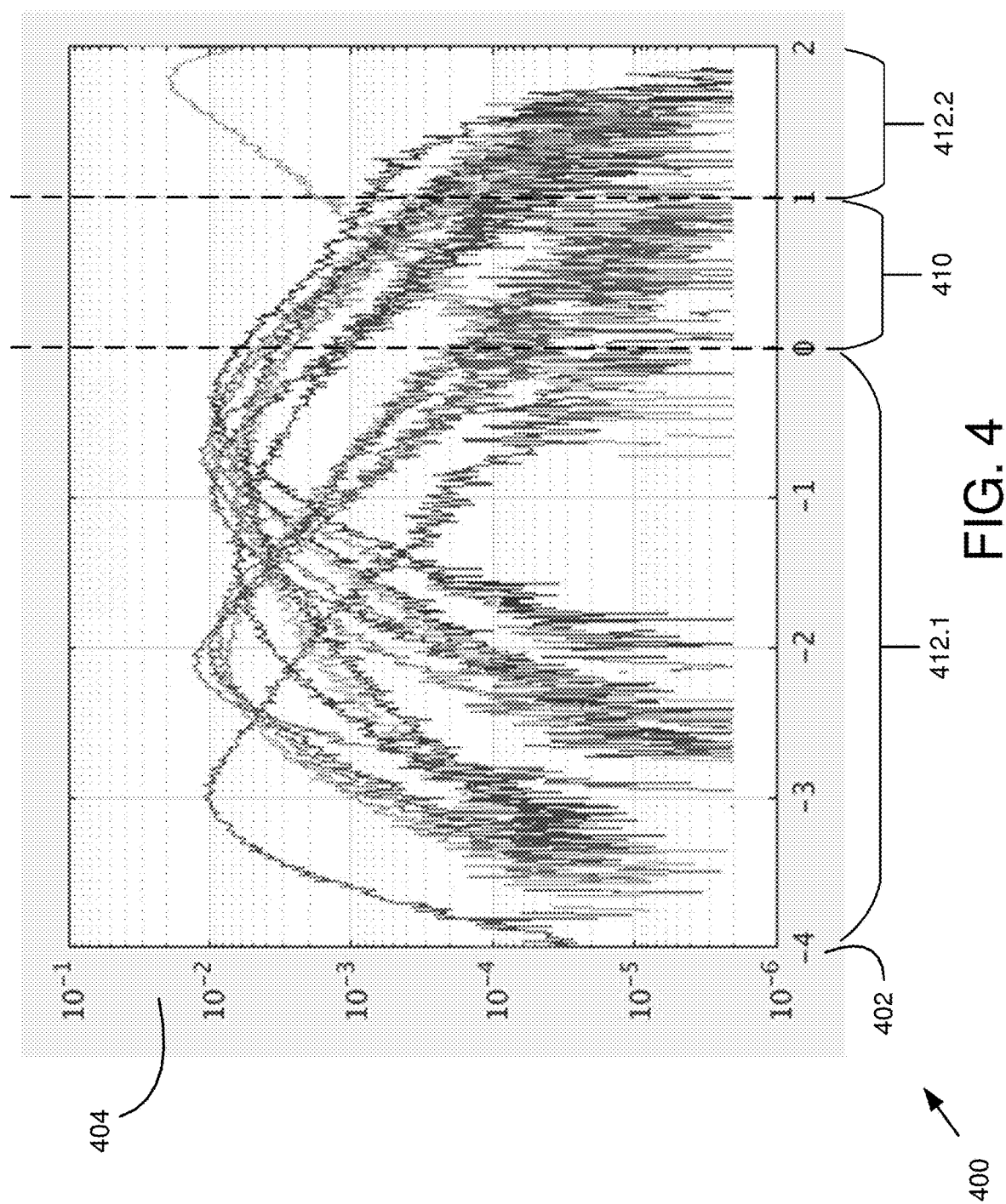
FIG. 4 is an example graph of the probability density function for an example state based in training data for a set of input signal states.

In some configurations, multiple training metrics may be used in the cost functions with the goal of maximizing the separation of correct and incorrect output values. For example, the range of output values from the filter may be divided into a series of ranges, such as an inner range and one or more outer ranges. In FIG. 4, a graph 400 of probability density function (PDF) output for a series of training data (sequential signal values) is shown for a single state, with the range of output values on X-axis 402 and the (logarithmic) range for PDF values on Y-axis 404. For example, the state may equal 6 for training the sixth state equalizer filter, where, generally, the output should be trained toward 1 for the correct input signal for state 6 and the output should be trained toward 0 for the incorrect state (any state but state 6). Inner range 410 may be defined between the two indicator values of 0 and 1. Outer range 412 may include values outside of inner range 410, such as −4 to 0 in outer range 412.1 and 1 to 2 in outer range 412.2. In some configurations, MSE and/or an MI metric may be applied as the cost function for increasing the separation of incorrect and correct outputs. For example, an MI metric may be calculated using log-likelihood ratios (LLR) and the known input patterns to quantify how much information a bit or symbol contains. Training with the MI metric toward an ideal value of 1 may increase the separation of ambiguous values in inner range. In some configurations, each filter may be trained simultaneously for both MSE and MI using separate cost functions. For example, a least mean squares (LMS) algorithm may be used to determine the cost function, gradient, and training algorithm for MSE training and cross-entropy using a softmax algorithm and probability functions may be used to determine the cost function, gradient, and training algorithm for the MI metric.

In some configurations, soft training may be used to accelerate separation of correct and incorrect signals by acknowledging that the actual value of the filter output is not as relevant as assuring that clear separation is achieved. For example, the inner range and each of the outer ranges may use different sets of training conditions for determining whether or not the weight coefficient is modified in response to particular input/output criteria. In some configurations, the inner range may be trained based on a training condition that includes all output values, regardless of whether the training input signal included a correct state or an incorrect state. The first outer range, where the output values are outside and below the incorrect state indicator value, may be trained based on a training condition that excludes incorrect state output values (i.e., output values indicating an input signal for an incorrect state) from training—an output below 0 achieves desired separation and does not need to be pushed back toward 0. The second outer range, where the output values are outside and above the correct state indicator value, may be trained based on a training condition that excludes correct state output values (i.e., output values indicating an input signal for the correct state for that filter) from training—an output above 1 achieves desired separation and does not need to be pushed back toward 1. These conditions may reduce total processing and avoid local minimums leading to poorer separation.

In some configurations, training of trained filter weight coefficients 334 may include multiple phases based on a particular training data set. For example, a first training phase may operate using a first set of training conditions and a first portion of the training data set, such as a predefined number of sectors of sequential read signal data. A second training phase may follow the first phase and include a second set of training conditions and a second portion of the training data, such an additional number of sectors of sequential read signal data or an open-ended data set used until a target quality or confidence parameter is achieved. In some configurations, the mean of the output values may be allowed to float and be recalculated throughout the first training phase as part of the MSE and/or MI metric cost function calculations. During the second training phase, the mean values for each possible state of each filter may be fixed based on the mean values at the end of the first training phase. For example, during the first training phase the $n^2$ (e.g., 256 for 16 states) mean values (a mean value for each input state for each filter) may change dynamically and iteratively with each new training data sample. During the second training phase, no new mean values may be calculated and the $n^2$ mean values may be fixed as constants in the cost functions (such as based on the mean values at the end of the first training phase). In some configurations, the first training phase may be based on a first portion of the training data set with a predefined size or number of samples, such as 100 sectors of training data. In some configurations, the first training phase may be based on a first portion of the training data set that achieves a desired MI metric or other separation metric for correct and incorrect states. The second training phase may be an extended training phase for the full training data set (which may be a predetermined size or based on achieving a second quality or confidence metric). Once the means are fixed, the second training phase will tend to minimize deviations from the means and improve output probabilities to reduce noise correlations in the signal processing.

Figure 5B:
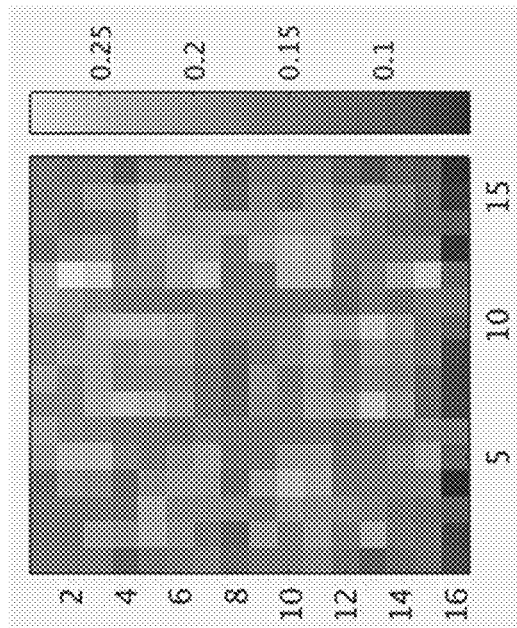
FIGS. 5A, 5B, 5C, and 5D are matrix diagrams (input states to output states) of mean and mean square error (MSE) sigma$^2$ after two training phases.
Figure 5D:
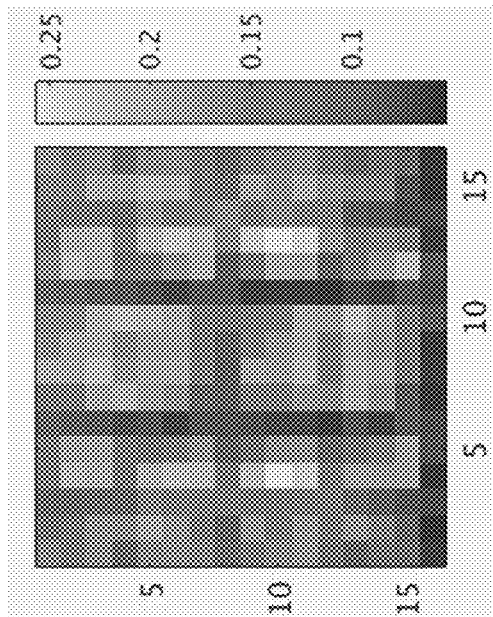
Figure 5A:
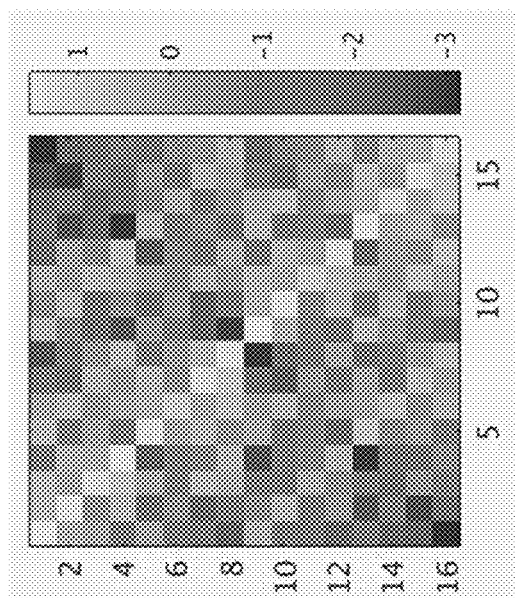
Figure 5C:
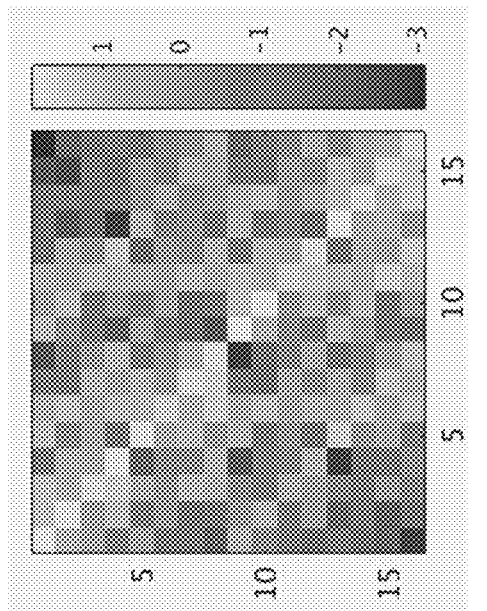

FIGS. 5A-5D show example mean and MSE sigma² outputs for the two training phases. FIGS. 5A and 5C show a matrix of mean values for the sixteen input states and sixteen filters configured for the sixteen output states. Figured 5B and 5D show the MSE sigma² values for the same matrix of input and output states. FIGS. 5A and 5B show the output distributions after the first training phase and FIGS. 5C and 5D show the output distributions after the second training phase. As show, the mean values of FIG. 5A are fixed and remain unchanged in FIG. 5C, but the sigma² values continue to adjust through the extended training to improve output probabilities in Figured 5D by reducing variances or sigma.

Returning to FIG. 3, state equalizer filters 332 with trained filter weight coefficients 334 may generate a set of state values 336 corresponding to one state value per potential state and corresponding filter. For example, state values 336 may include filtered output values in the range of −4 to 2 for each state value 336.1-336.$n$. State values 336 may be provided to a comparator 338, such as a matrix comparator, configured to map the set of state values 336.1-336.$n$ to a corresponding set of probability values 342.1-342.2 using a state probability calculator 340. In some configurations, comparator 338 may be configured to use measured values from training the filters to determine the probabilities. For example, comparator 338 may be configured with an approximation of the PDFs (e.g., graph 400 in FIG. 4) calculated during training, such as a gaussian distribution for each filter and the mean values and MSE sigma$^2$ values for each of the 256 possible states (input state to output state combinations). Comparator 338 may calculate the deviation of each state value 336 from the measured mean values for that filter/state, taking into account the sigma$^2$ values for those mean values. Comparator 338 may use a matrix of values corresponding to each possible input state mapped to each possible output state. State probability calculator 340 may be configured to output a result of a probability computation for each state based on the deviations (differences) determined by comparator 338. For example, the mean difference and measured sigma2 may be used to calculate state probability values 342.1-342.$n$.

State probability values 342, such as state values 342.1-342.$n$, may initialize the states of iterative decoder 350. For example, iterative decoder 350 may include a soft output detector 352 that includes Viterbi/BCJR matrix for iterative calculation of the bit LLR values using Viterbi or BCJR algorithms. Thus, soft output detector 352 may receive a set of initial probabilities, such as LLR values, based on state equalizer filters 332 for each possible state. State probabilities 342.1-342.$n$ may populate the decision matrix for soft information decisions by soft output detector 352, which can then be refined into codeword determinations through iteration with the LDPC decoder of iterative decoder 350. The codeword determinations may, in turn, be used to decode the data bits encoded in the analog read signal and return decoded data units to the data storage device firmware and/or host system. In some configurations, decoded data units may be treated as known signal values for ongoing training of trained filter weight coefficients 334 during data processing operations of the read channel circuit and the data storage device it is a part of. Additional loops for ongoing training of filter weight coefficients may also be possible based on data from the processing of iterative decoder 350. For example, the training data may be based on soft output detector 352 soft information during the processing of a current sector, with or without delay, and/or back-end iterative decoder decisions, with or without delay.

Figure 6:
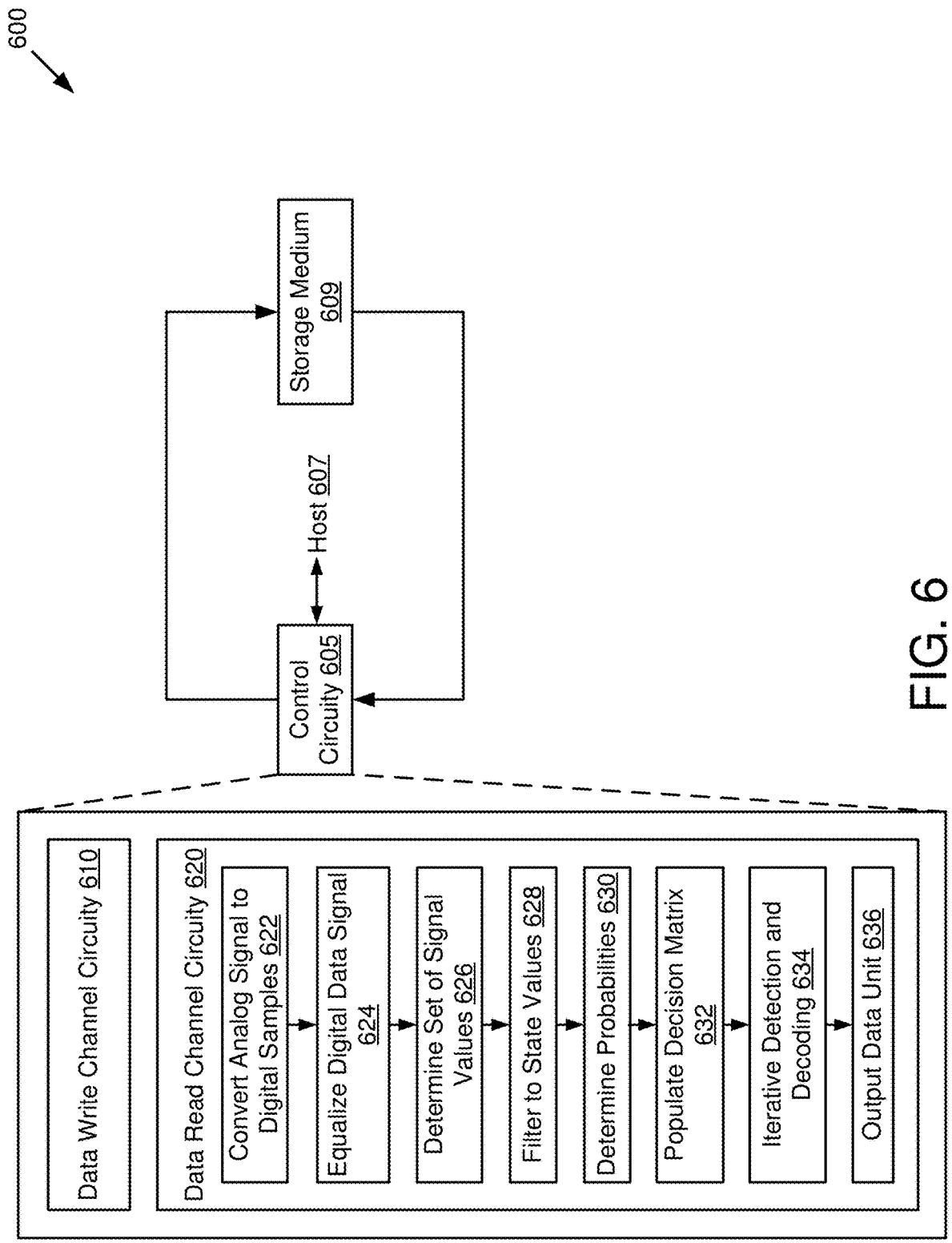
FIG. 6 is an example data storage device incorporating a states equalizer in data read channel circuitry.

FIG. 6 is a block diagram illustrating an example storage system 600 having a states equalizer filter integrated in a read channel circuit. As illustrated, the storage system 600 includes control circuitry 605, a host computing system 607 (may be simply referred as "host"), and a storage medium 609. The storage medium 609 may comprise any suitable storage medium including, but not limited to a hard disk drive (HDD), a solid-state drive (SSD), a flash drive, an optical drive, a tape drive, an older form of drive such as floppy drives, volatile or non-volatile memory, etc.

The host 607 is a computer system or other external system or device to which the storage medium 609 is coupled and/or with which the storage medium 609 is integrated. The storage medium 609 is accessible for data storage and I/O (input/output) operations. For instance, the host 607 may issue commands for data manipulation in the storage medium 609. The control circuitry 605 mediates the communication between the host 607 and the storage medium 609 and provides an interface between the storage medium 609 and a bus connecting it to the rest of the system. For example, control circuitry 605 may be a drive or memory controller of a data storage device. As illustrated in the figure, the control circuitry 605 may include data write channel circuitry 610 for data writing execution and a data read channel circuitry 620 for data reading execution. For example, data write channel circuitry 610 may incorporate elements similar to write path 202 in FIG. 2 and data read channel circuitry 620 may incorporate elements similar to read channel 300 in FIG. 3. In the disclosed examples, the control circuitry 605 may employ trained states filters in line between an ADC and an iterative decoder to improve error rate performance and/or provide data recovery functionality.

When reading data from the storage medium 609, the control circuitry 605 may receive a command signal from the host 607, which instructs the control circuitry 605 to access a certain portion of storage medium 609 (e.g., the locations of blocks on a magnetic disc, in memory, etc. corresponding to a data unit) to be accessed. As a further example, in an embodiment involving an HDD, in response to the command signal, servo electronics within the control circuitry 605 may produce control signals that position a data head over a desired track in the storage drive, which develops a read signal indicative of flux reversals in the track over which the data head is positioned.

An input signal (e.g., the read signal) may, in some cases, be provided to preconditioning logic in the data read channel circuitry 620, which may include a preamplifier, an analog to digital converter (ADC) and/or filtering circuitry, as is described elsewhere herein, such as with reference to FIGS. 2 and 3. As shown in block 622, the ADC may convert analog signals into digital samples forming a bit or symbol sequence in a digital data signal. The digital data signal may be equalized by a signal equalizer at block 624 before being passed to the states equalizer circuit. The states equalizer may select a moving set of signal values, including a target signal value and a sequential series of prior signal values, at block 626. At block 628, the states equalizer may filter the selected set of signal values through a set of parallel state filters corresponding to the different possible states of the target signal value and, at block 630, determine a set of state probabilities based on the state values output from each state filter. The states equalizer may output the state probabilities to a SOVA (Viterbi detector) to populate the initial probability states of the decision (e.g., Viterbi) matrix at block 632. The SOVA may process the probability matrix, generate soft bit predictions for a data unit, and iterate based on LDPC decoding and extrinsic probability feedback at block 634. At block 636, the decoded data unit may then be output to the host computing system 607 in response to a read command signal received from the host 607.

Figure 7:
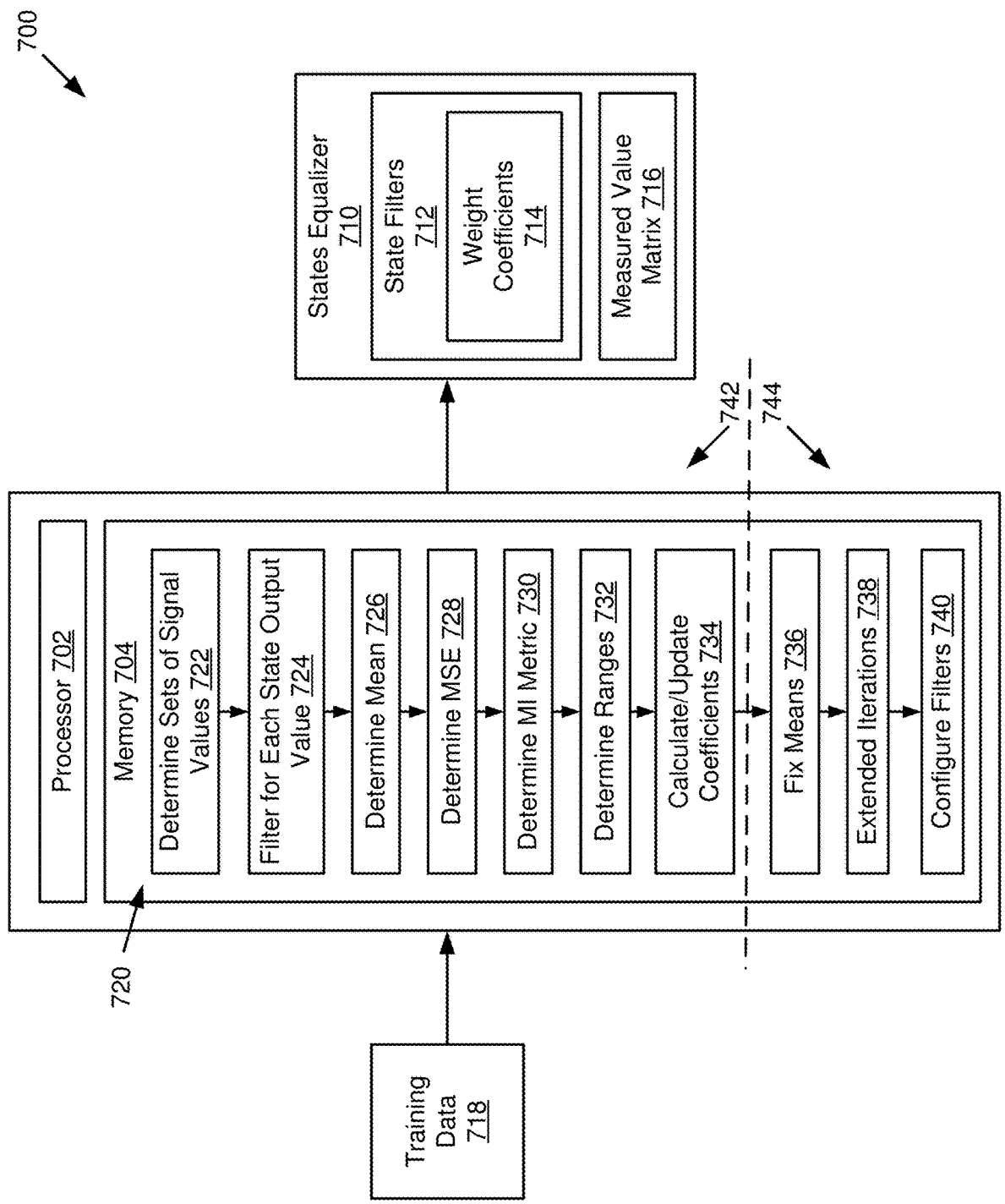
FIG. 7 is an example training system for a states equalizer.

FIG. 7 is a block diagram illustrating an example training system 700 for configuring the states equalizers used in the read channel circuits, such as the read channel circuits of FIGS. 3 and 6. In some configurations, training system 700 comprises firmware or software executed by a processor 702 and stored in a memory 704 to execute instructions for a training process 720. For example, processor 702 and memory 704 may include the processor and memory resources of a data storage device controller and/or read channel circuit that executes calibration and/or training protocols during a manufacturing process and/or throughout the operating life of the data storage device. As another example, a manufacturing computer system may be connected or otherwise communicate with the data storage device to execute some or all of the calibration and/or training protocols. Processor 702 may include any type of conventional processor or microprocessor that interprets and executes instructions. Memory 704 may include a random access memory (RAM) or another type of dynamic storage device that stores information and instructions for execution by processor 702 and/or a read only memory (ROM) or another type of static storage device that stores static information and instructions for use by processor 702 and/or any suitable storage element, such as a system portion of a hard disk media or a solid state storage element.

Training system 700 is configured to train states equalizer 710 and, more specifically, the weight coefficients 714 of state filters 712 through training process 720. Training system 700 may use a set of training data 718 to provide the known bit/symbol pattern input data signals for training process 720. For example, training data 718 may include a number of sectors, tracks, symbols, etc. with known bit patterns for training. In some configurations, training data 718 may be written to and read from the non-volatile storage medium of the data storage device. In some configurations, training data may be generated from another source, such as the memory of the training system, and may include analog or digital signal data injected into the read channel as an analog or digital data signal. In some configurations, training data may be continuously generated responsive to the data processing operations of the data storage device. For example, as data units are decoded by the read channel circuit, the decoded data units, such as a successfully decoded data sector, may enable the corresponding input data signal to be treated as a known bit pattern for training and used as training data 718.

In some configurations, as explained further below, training data 718 may be divided into multiple portions for different training phases of training process 720, such as a first portion of the training data set for establishing mean values for the matrix of possible input signals to output signals and a second portion of the training data set for extended training with fixed mean values. In some configurations, training system 700 may also determine a measured value matrix for use by states equalizer 710 in comparator and probability calculation functions. For example, based on the mean and mean sigma$^2$ values determined during training, states equalizer 710 may store a matrix of values used by the comparator to determine the deviation of filtered output signals from the measured values during normal operation of the read channel (e.g., after training is complete). In some configurations, ongoing training responsive to data storage operations may use the extended training process.

At block 722, sets of input signal values may be determined for each target signal value and iteration of training process 720. For example, states equalizer 710 may select a moving set of signal values from training data 718, including the target signal value and a number of preceding signal values, in the digital data signal for each training iteration.

At block 724, the current set of input signal values may be filtered through each state filter 712 using the current values for weight coefficients 714 to determine state output values. For example, states equalizer 710 may send the input signal values to each state filter 712 in parallel to determine an output set of state values with one state value for each state filter 712 and corresponding possible state.

At block 726, an updated mean may be determined from each output state value (and prior mean values). For example, training system 700 may recalculate the mean value for each iteration to that state filter with the same input state value, mapped to the matrix of all possible input states to all possible output states.

At block 728, an updated MSE value may be determined for each output state value (based on prior MSE values). For example, training system 700 may recalculate the MSE value for each iteration to that state filter with the same input state value, mapped to the matrix of all possible input states to all possible output states.

At block 730, an updated MI metric value may be determined for each output state value (based on prior MI metric values). For example, training system 700 may recalculate the MI metric value for each iteration to that state filter with the same input state value, mapped to the matrix of all possible input states to all possible output states.

At block 732, ranges may be determined for each output state value. For example, training system 700 may use ranges to reduce the number of calculations and exclude certain iterations for output state values in the outer ranges of the possible signals (as described elsewhere). In some configurations, range determination may be done earlier in the calculations at blocks 726-734 to avoid unnecessary calculations.

At block 734, updates to weight coefficients 714 may be calculated for the current iteration. For example, training system 700 may use the calculations and determinations of blocks 726-732 in one or more calculations to adjust weighting coefficients 714 for each filter (not excluded by the range rules), based on the cost function, gradient, and training algorithms for that state filter and metric (e.g., MSE/LMS or MI metric).

In some configurations, iterations through blocks 722-734 may constitute a first training phase 742 to set mean values (while also establishing the other metrics) based on a first portion of training data 718, such as the first 100 sectors of training data 718. At block 736, the mean values may be fixed based on the final values of first training phase 742. For example, training system 700 may fix each measured mean value corresponding to the matrix of all possible input states to all possible output states, determining a set of mean values for each input state for each state filter 712. Second or extended training phase 744 may return to block 722 from block 738 for extended iterations using a remaining portion of training data 718, but now skips block 726, using the means fixed at block 736 for remaining iterations.

Upon reaching an exit condition, such as completion of training data 716 or meeting a specific quality or confidence target for states equalizer 710 and/or the read channel circuit as a whole, training process 720 completes at block 740 by configuring state filters 712 with weight coefficients 714 determined during training process 720. For example, the final set of weight coefficients, such as corresponding to a number of tap weights equal to the number of input signal values in the sets of signal values from block 722, for each state filter 712 may be stored in states equalizer 710 for use during normal operation of the read channel circuit.

Figure 8:
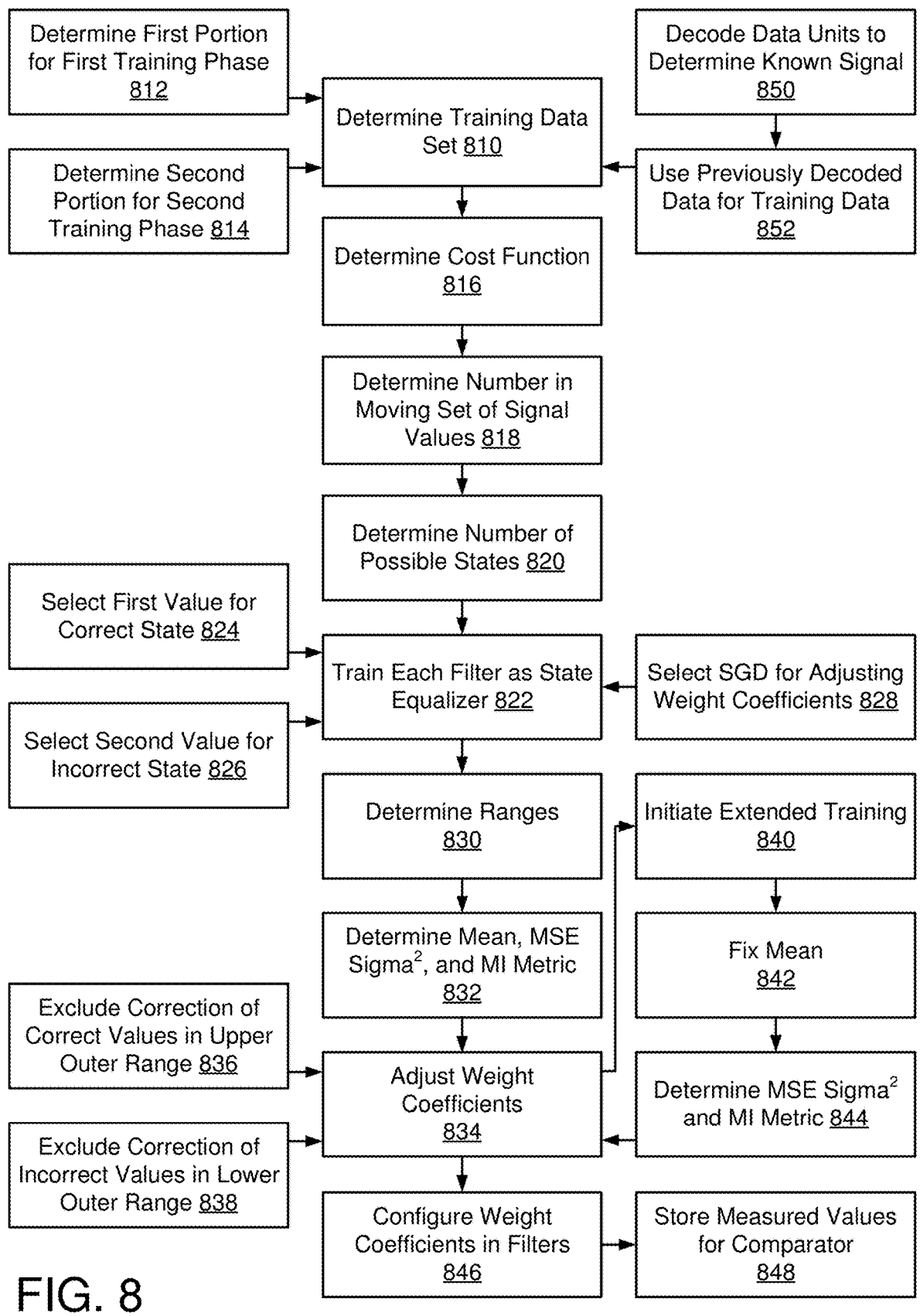
FIG. 8 is an example method of training the weight coefficients of a states equalizer.

As shown in FIG. 8, read channel circuit 300, data storage device 600, and/or training system 700 may be operated according to an example method of training the weight coefficients of a states equalizer, i.e., according to the method 800 illustrated by blocks 810-848.

At block 810, a training data set may be determined for training the states equalizer for a read channel. For example, the training data set may include a sequence of known input data states in an analog data signal for processing by the states equalizer. In some examples, the training data set may be generated using the read path of the read channel and the storage medium of the data storage device the read channel operates in. In some configurations, at block 812, a first portion of the training data set may be determined for a first training phase and, at block 814, a second portion of the training data set may be determined for a second training phase for extended training.

At block 816, at least one cost function may be determined for training the weight coefficients of the state filters in the states equalizer. For example, cost functions may be selected to optimize both an MSE metric and an MI metric for increasing separation of correct and incorrect state signals.

At block 818, a number in a moving set of signal values may be determined. For example, the state filters may be selected with a number of taps corresponding to the number of signal values to be processed for each determination of the output state value for a target signal value.

At block 820, a number of possible states may be determined. For example, the read/write channel may be configured to support a particular symbol size and the number of bits in the symbol may determine the number of possible states for each symbol.

At block 822, each state filter may be trained as a state equalizer for a particular output state value. For example, each state filter may be configured to be (ideally) correct for one input/output state value combination. At block 824, a first output state value may be selected for correct states, such as 1, and, at block 826, a second output state value may be selected for incorrect states, such as 0. Training each state filter may include selecting a gradient-based optimization algorithm for iteratively training the weight coefficients of the state filters. For example, in some configurations, at block 828, an SGD algorithm may be selected and configured for adjusting weight coefficients in method 800.

At block 830, ranges may be determined for different training processes during each iteration. For example, the output state value from each state filter may be a value in an inner range or upper or lower outer ranges (with borders determined by the correct and incorrect state values selected at block 824 and 826) and these ranges may determine training processes further described with regard to blocks 834-838.

At block 832, metrics, such as mean, MSE sigma$^2$, and MI metrics, for each iteration and each state filter may be determined. For example, based on the state value output by each state filter, mean, MSE sigma$^2$, and MI metrics may be iteratively calculated based on values from prior iterations.

At block 834, weight coefficients may be adjusted during each iteration. For example, the cost functions, gradients, and training algorithms may be applied to the prior metric values and current metric values to determine adjustments to one or more weight coefficients, such as tap weights, in each state filter. In some configurations, weight coefficients may be selectively adjusted depending on the range of the state value for that state filter. For example, weight coefficients may be adjusted for all state values in the inner range. However, at block 836, correction of correct state values may be excluded in the upper outer range, because separation of the correct state value is already higher than the first value for the correct state. At block 838, correction of incorrect state values may be excluded in the lower outer range, because separation of the incorrect state value is already lower than the second value for the incorrect state.

In some configurations, an extended training process may follow an initial training process. For example, blocks 822-838 may be executed for a first portion of the training data set. At block 840, an extended training process may be initiated. For example, a second portion of the training data set may be used to further refine the weight coefficients for noise reduction and increased separation based on a fixed set of mean values. At block 842, the mean values may be fixed. For example, the mean values for each combination of input state and output state may be fixed based on the initial training process. At block 844, the metrics other than mean may be determined through each subsequent iteration in the extended training phase. For example, based on the state value output be each state filter and the corresponding fixed mean value, MSE sigma$^2$ and MI metrics may be iteratively calculated based on values from prior iterations and used to adjust weight coefficients at block 834.

At block 846, weight coefficients may be configured in the state filter. For example, the set of weight coefficient values for each state filter may be stored in the states equalizer for use during normal operation of the read channel circuit. In some configurations, at block 848, final measured values from the training process may be stored for use by the comparator in the states equalizer. For example, the final measured mean values and MSE sigma$^2$ values may be stored for each combination of state filter (output states) and the different input states in a matrix for use in determining deviations in the runtime output state values from each state filter. These difference values may then be used for calculating state probability values, as further described with regard to method 900 in FIG. 9.

In some configurations, after an initial training, such as during data storage device manufacturing or configuration, ongoing training of state equalizer filter weight coefficients may occur responsive to data processing operations. At block 850, data units may be decoded (using the previously determined weight coefficients for the states equalizer) to determine known input signal values corresponding to the decoded data unit. For example, an iterative decoder may complete processing of the input data signal based on the state probabilities from the states equalizer that initially populated the decision matrix of the soft output detector and return a decoded data unit, such as a data sector. At block 852, previously decoded data may be used for training data. For example, the input data signal and bit values from the decoded data unit may be used as the training data set for further iterations of extended training of the weight coefficients. Each iteration of such training during data processing operations may further adjust or update the weight coefficients used by the states equalizer.

Figure 9:
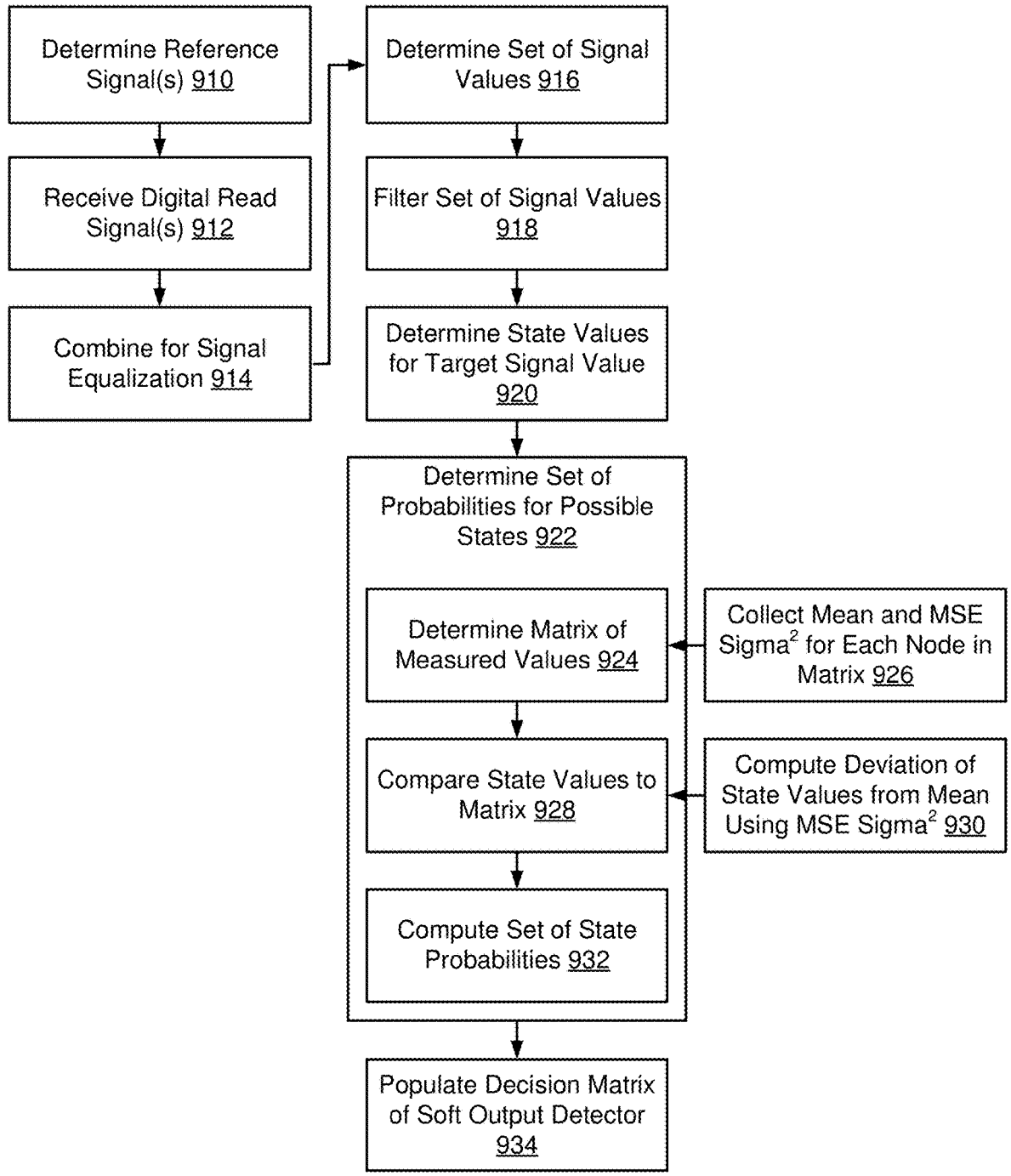
FIG. 9 is an example method of operation of a states equalizer to provide state probabilities to a soft output detector.

As shown in FIG. 9, read channel circuit 300 and/or data storage device 600 may be operated according to an example method of operation of a states equalizer to provide state probabilities to a soft output detector, i.e., according to the method 900 illustrated by blocks 910-934.

At block 910, reference signals may be determined for a signal equalizer. For example, a signal equalizer may be configured with an ideal wave form for combining and equalizing an input digital data signal.

At block 912, at least one digital read signal may be received. For example, the signal equalizer may receive input digital data signals corresponding to one or more read elements from one or more corresponding ADCs.

At block 914, signals may be combined for signal equalization. For example, the signal equalizer may filter or combine the input digital data signals with the reference signals to condition and equalize the digital data signals to an equalized digital data signal.

At block 916, a set of signal values may be determined. For example, the states equalizer may select a number of signal values corresponding to a moving window of signal values including a target signal value and a plurality of sequentially adjacent signal values.

At block 918, the set of signal values may be filtered by a plurality of state filters. For example, the states equalizer may include a set of state filters corresponding to all possible states of the target signal value and may direct the set of signal values to each state filter in parallel.

At block 920, a set of state values for the target signal value may be determined. For example, each state filter may output a state value for the state corresponding to that state filter and the resulting set of state values will include an output state value for each possible state.

At block 922, a set of probabilities for the possible states may be determined. For example, the states equalizer may process the set of state values from block 920 to output a corresponding set of state probabilities for each possible state. Additional details of an example method of determining the set of probabilities is further described below with regard to block 924-932.

At block 924, a matrix of measured values may be determined. For example, the states equalizer may store a set of measured values, such as mean output signal values and corresponding MSE sigma$^2$ values, corresponding to the combinations of input states and output states for the state filters. In some configurations, at block 926, the mean and MSE sigma$^2$ values have been collected in a matrix corresponding to the combinations of input states and output states. For example, a training system may have collected the values during a training process and stored the matrix of measured values in the state equalizer.

At block 928, the set of state values may be compared to the measured values in the matrix. For example, a comparator may compare the output state value from each filter to the corresponding measured mean output values for the possible input states. In some configurations, at block 930, a deviation of the state values may be computed from the measured mean values using the measured MSE sigma$^2$ values. For example, the comparator may calculate a deviation from the measured mean value taking the corresponding MSE sigma$^2$ value into account for each state filter and its state value.

At block 932, a set of state probabilities may be computed. For example, based on the deviations calculated by the comparator, the state equalizer may map each state value to a corresponding state probability value.

At block 934, a decision matrix of a soft output detector may be populated with the set of state probability values. For example, the states equalizer may return the set of state probabilities to an iterative decoder to initialize the nodes of a SOVA decision matrix for iterative soft output detection and subsequent iterative decoding by an LDPC decoder.

Technology for improved read channel data detection using a states equalizer to equalize signals for each possible state for inputting probabilities into an iterative decoder is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A read channel circuit, comprising:
a states equalizer configured to:
receive a digital data signal representing a series of data bits;
determine a set of signal values from the digital data signal;
filter the set of signal values through a set of finite impulse response filters configured to filter the set of signal values to a set of state values for a target signal value; and
determine, based on the state values, a set of probabilities for possible states of the target signal value; and
a soft output detector configured to receive the set of probabilities for possible states from the states equalizer to populate a decision matrix.

2. The read channel circuit of claim 1, wherein the set of finite impulse response filters comprise weight coefficients trained to increase mutual information based on separating correct states from incorrect states.

3. The read channel circuit of claim 1, wherein:
the set of finite impulse response filters include a plurality of finite impulse response filters;
each filter of the plurality of finite impulse response filters is trained as a state equalizer for a corresponding state of the set of state values; and
each filter of the plurality of finite impulse response filters is trained to return a first value if the corresponding state is correct for the target signal value and a second value if the corresponding state is incorrect for the target signal value.

4. The read channel circuit of claim 1, wherein the set of finite impulse response filters are trained using stochastic gradient descent using mean square error and a mutual information metric.

5. The read channel circuit of claim 1, wherein:
filter output values from a training set of signal values are divided into at least an inner range, a first outer range, and a second outer range;
the set of finite impulse response filters are trained using:
a first training condition for adjusting weight coefficients for filter output values in the inner range;
a second training condition for adjusting weight coefficients for filter output values in the first outer range; and
a third training condition for adjusting weight coefficients for filter output values in the second outer range;
the first training condition includes correction based on correct state and incorrect state filter output values in the inner range;
the second training condition excludes correction of incorrect state filter output values in the first outer range; and
the third training condition excludes correction of correct state filter output values in the second outer range.

6. The read channel circuit of claim 1, further comprising:
an iterative decoder configured to use soft information from the decision matrix of the soft output detector to decode data units from the digital data signal, wherein the read channel circuit is configured to:
determine a training set of signal values using data processed by the iterative decoder; and
train, responsive to data processing operations of the read channel circuit, weight coefficients of the set of finite impulse response filters.

7. The read channel circuit of claim 1, wherein:
the set of finite impulse response filters are trained using:
a first training phase for training mean values, means square error values, and mutual information metrics; and
a second training phase for extended training of mean square error values and mutual information metrics with fixed mean values;

the first training phase includes a first portion of signal values in a training set of signal values; and the second training phase includes a second portion of signal values in the training set of signal values that follow the first portion.

8. The read channel circuit of claim 1, wherein determining the set of probabilities for possible states comprises:

determining a matrix of measured values mapping probability density functions of input states to output states; and comparing the set of state values to the matrix of measured values to compute the set of probabilities for possible states for the target signal value.

9. The read channel circuit of claim 8, wherein:

the determining the matrix of measured values further comprises collecting a mean value and a mean square error sigma$^2$ value for each node of the matrix; and comparing the set of state values to the matrix of measured values includes computing deviation of state values from the set of state values from mean values using mean square error sigma$^2$.

10. The read channel circuit of claim 1, further comprising:

a signal equalizer configured to:
receive at least one digital read signal from at least one corresponding read element; and
combine the at least one digital read signal and at least one corresponding reference signal to equalize the digital data signal received by the states equalizer.

11. A data storage device comprising the read channel circuit of claim 1.

12. A method comprising:

determining a set of signal values from a digital data signal representing a series of data bits;

filtering the set of signal values through a set of finite impulse response filters configured to filter the set of signal values to a set of state values for a target signal value, wherein each filter in the set of finite impulse response filters corresponds to a potential state of the target signal value;

determining, based on the state values, a set of probabilities for possible states of the target signal value; and populating, using the set of probabilities, a decision matrix for a soft output detector.

13. The method of claim 12, further comprising:

training weight coefficients of the set of finite impulse response filters to increase mutual information based on separating correct states from incorrect states.

14. The method of claim 12, further comprising:

decoding, by an iterative decoder using soft information from the decision matrix of the soft output detector, data units from the digital data signal;

determining a training set of signal values using data processed by the iterative decoder; and training, responsive to data processing operations of a read channel circuit, weight coefficients of the set of finite impulse response filters.

15. The method of claim 12, further comprising:

training each filter in the set of finite impulse response filters as a state equalizer for a corresponding state of the set of state values; and training each filter of the set of finite impulse response filters to return a first value if the corresponding state is correct for the target signal value and a second value if the corresponding state is incorrect for the target signal value.

16. The method of claim 12, further comprising:

training the set of finite impulse response filters using stochastic gradient descent based on mean square error and a mutual information metric.

17. The method of claim 12, further comprising:

dividing filter output values from a training set of signal values into at least an inner range, a first outer range, and a second outer range; and training the set of finite impulse response filters by adjusting weight coefficients to correct for filter output values, wherein training the set of finite impulse response filters includes:

correcting for correct state and incorrect state filter output values within the inner range;

excluding correction for incorrect state filter output values in the first outer range; and excluding correction of correct state filter output values in the second outer range.

18. The method of claim 12, further comprising:

training, during a first training phase, the set of finite impulse response filters using mean values, means square error values, and mutual information metrics, wherein the first training phase includes a first portion of signal values in a training set of signal values; and training, during a second training phase and with fixed mean values, the set of finite impulse response filters for extended training of mean square error values and mutual information metrics, wherein the second training phase includes a second portion of signal values in the training set of signal values that follow the first portion.

19. The method of claim 12, wherein determining the set of probabilities for possible states comprises:

determining a matrix of measured values mapping probability density functions of input states to output states; and comparing the set of state values to the matrix of measured values to compute the set of probabilities for possible states for the target signal value.

20. The method of claim 19, wherein:

the determining the matrix of measured values further comprises collecting a mean value and a mean square error sigma$^2$ value for each node of the matrix; and comparing the set of state values to the matrix of measured values includes computing deviation of state values from the set of state values from mean values using mean square error sigma$^2$.

21. The method of claim 12, further comprising:

receiving, by a signal equalizer, at least one digital read signal from at least one corresponding read element; and combining, by the signal equalizer, the at least one digital read signal and at least one corresponding reference signal to equalize the digital data signal.

22. A system comprising:

means for receiving at least one digital read signal from at least one corresponding read element;

means for combining the at least one digital read signal and at least one corresponding reference signal to equalize a digital data signal representing a series of data bits;

means for determining a set of signal values from the digital data signal;

means for filtering the set of signal values through a set of finite impulse response filters configured to filter the set of signal values to a set of state values for a target signal value, wherein each filter in the set of finite impulse response filters corresponds to a potential state of the target signal value;

means for determining, based on the state values, a set of probabilities for possible states of the target signal value; and means for populating, using the set of probabilities, a decision matrix for a soft output detector.

\* \* \* \* \*